United States Patent [19]

Partio

[11] Patent Number: 5,393,102
[45] Date of Patent: Feb. 28, 1995

[54] FITTING ARRANGEMENT FOR FASTENING OF A STEAM JOINT

[75] Inventor: Martti E. O. Partio, Kouvola, Finland

[73] Assignee: Partio Engineering Ky, Kouvola, Finland

[21] Appl. No.: 53,634

[22] Filed: Apr. 27, 1993

Related U.S. Application Data

[63] Continuation-in-part of Ser. No. 835,939, Feb. 14, 1992, abandoned.

[30] Foreign Application Priority Data

Sep. 20, 1989 [FI] Finland ................... 894440

[51] Int. Cl.$^6$ .................................. F16L 41/12
[52] U.S. Cl. ........................... 285/24; 285/114; 285/134; 285/363; 248/56; 403/337
[58] Field of Search .................. 285/134, 27, 24, 114, 285/363, 405; 248/56; 403/337

[56] References Cited

U.S. PATENT DOCUMENTS

| | | | |
|---|---|---|---|
| 575,577 | 1/1897 | Smith | 285/363 X |
| 1,288,631 | 12/1918 | McFarland | 285/134 |
| 1,333,368 | 3/1920 | Auer | 285/363 X |
| 3,000,801 | 9/1961 | Downing | 285/114 X |
| 3,463,196 | 8/1969 | Richardson | 285/363 X |
| 3,985,378 | 10/1976 | Müller | 285/114 X |
| 4,477,107 | 10/1984 | Ferguson et al. | 285/114 |
| 4,491,755 | 1/1985 | Bertrand | 403/337 X |
| 4,779,900 | 10/1988 | Shumard | 285/114 |
| 5,299,880 | 4/1994 | Bouchard | 403/337 X |

FOREIGN PATENT DOCUMENTS

| | | | |
|---|---|---|---|
| 0453227 | 12/1948 | Canada | 285/134 |
| 0247806 | 2/1926 | United Kingdom | 285/134 |
| 0643723 | 9/1950 | United Kingdom | 285/134 |

Primary Examiner—Randolph A. Reese
Assistant Examiner—Heather C. Shackleford
Attorney, Agent, or Firm—Dressler, Goldsmith, Shore & Milnamow, Ltd.

[57] ABSTRACT

An arrangement for fastening of a steam joint to a paper machine frame or similar in alignment with the shaft of a steam cylinder is provided. The arrangement utilizes existing fixing points for the support of the old steam joint to the machine frame. Accordingly the arrangement comprises an annular rigid assembly plate having a center opening allowing free passage therethrough for parts of the steam joint to be connected with the interior of the steam cylinder, the assembly plate further being provided with

- a pair of first holes positioned diametrically on opposite sides of said center opening,
- at least two second holes positioned on opposite sides of the line defined by said first holes,
- a plurality of third holes distributed along the periphery of the assembly plate,
- a pair of first rigid fastening screws inserted with clearance through said pair of first holes and secured into threaded holes in the machine frame, distance means provided on said first screws between the machine frame and the assembly plate, second screws provided through said second holes of the assembly plate into engagement with the machine frame, a plurality of third screws for securing a bell support of the steam joint to the assembly plate with help of said plurality of third holes.

4 Claims, 5 Drawing Sheets

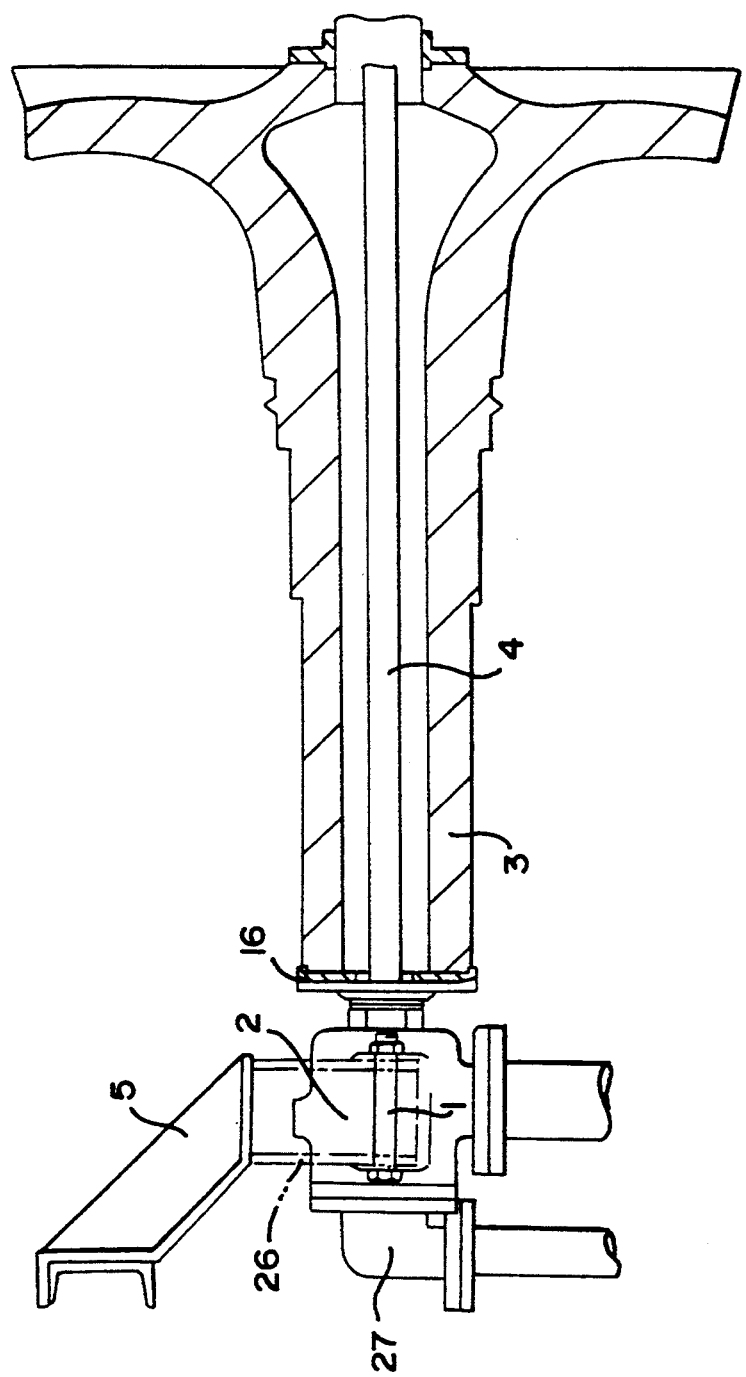

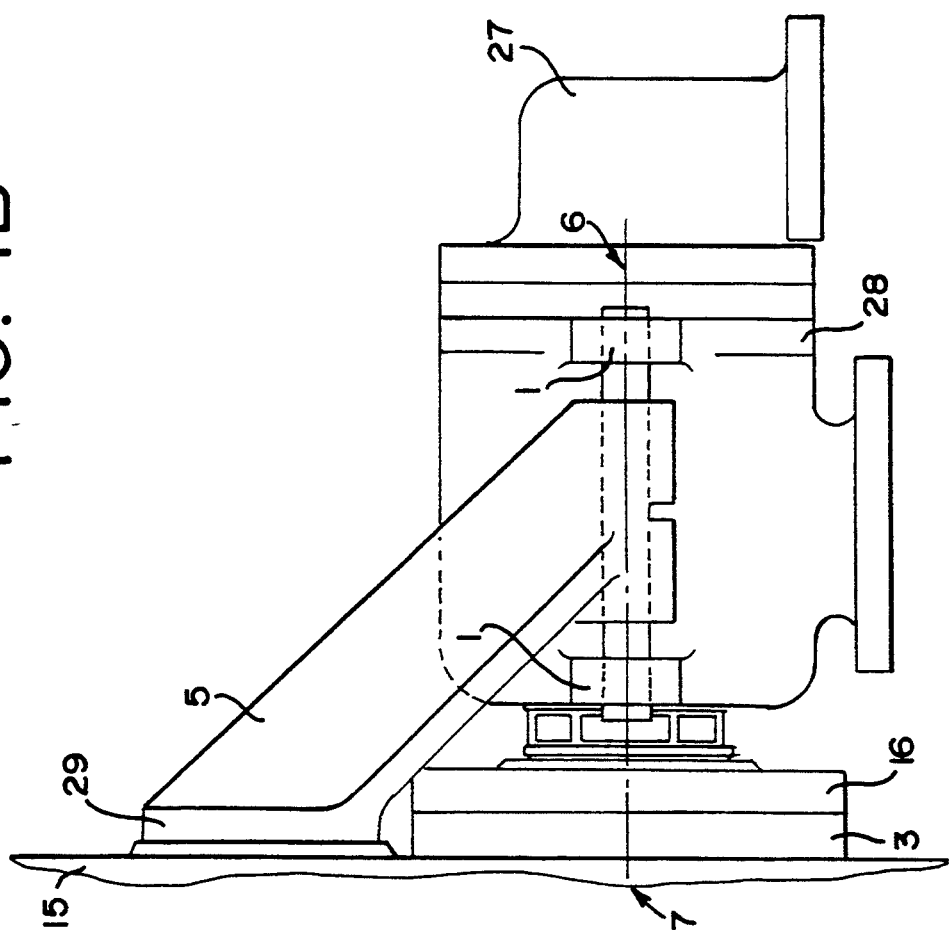
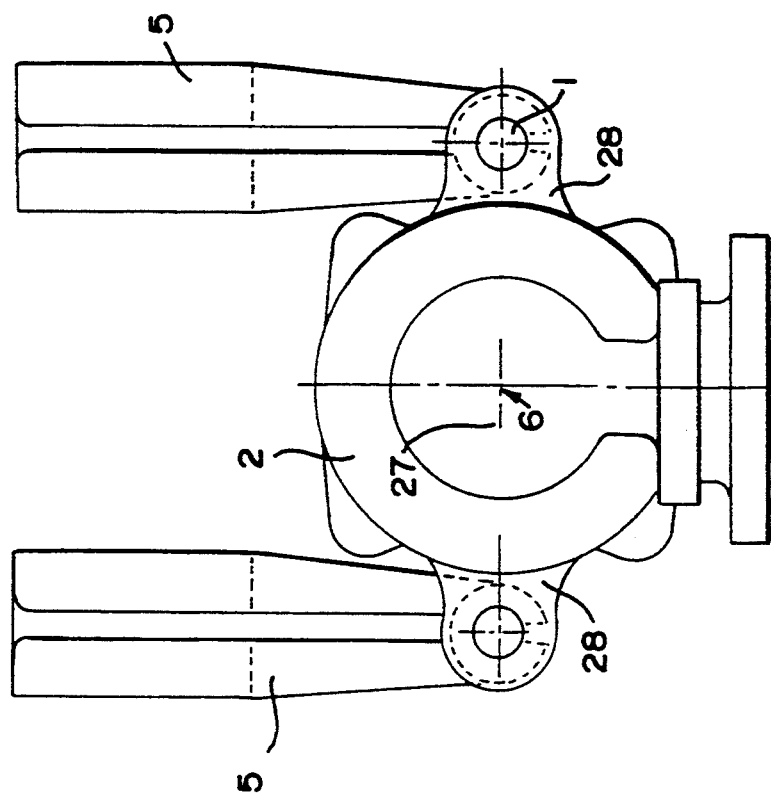
FIG. 4B
FIG. 4A

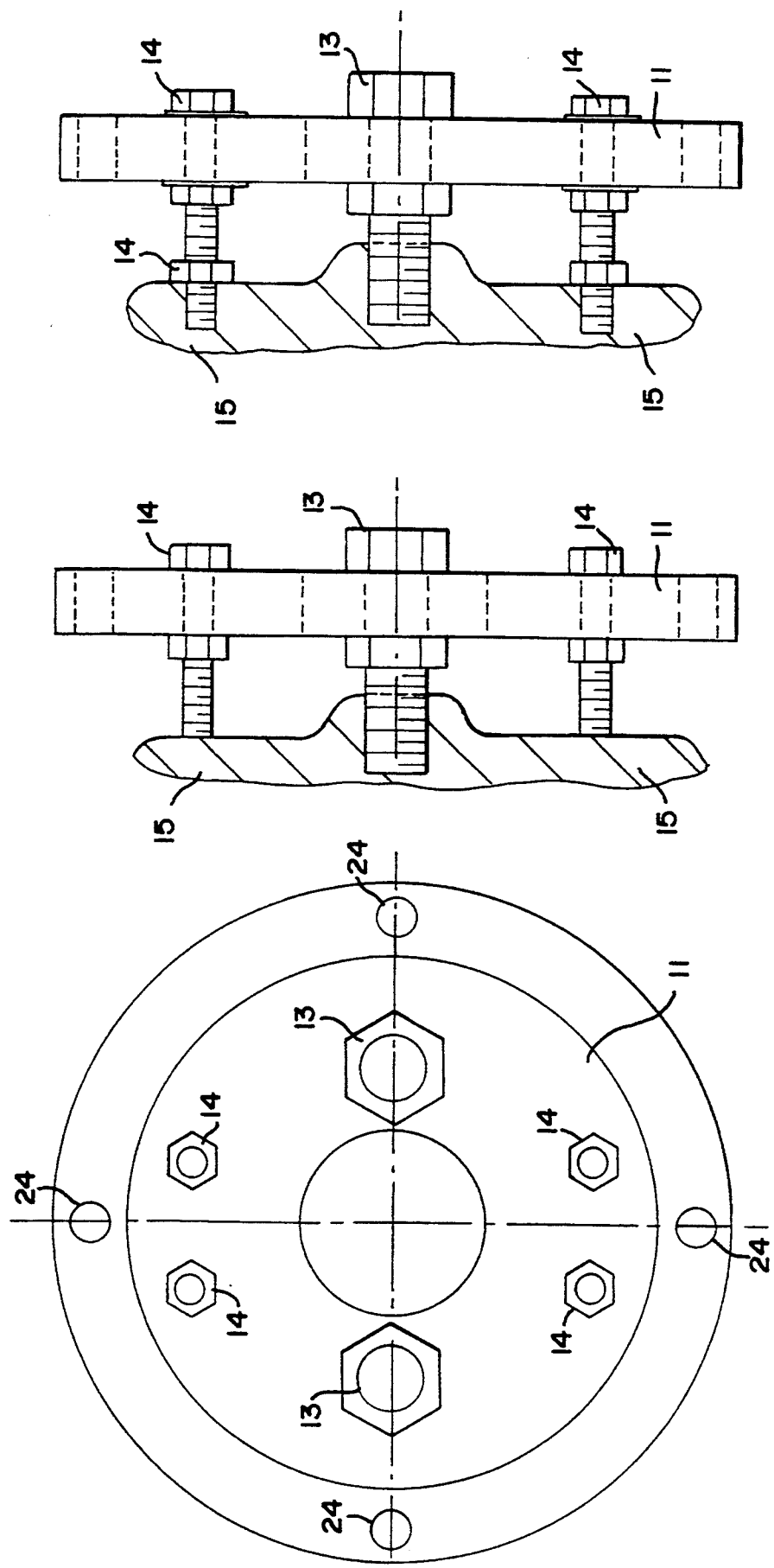

5,393,102

FITTING ARRANGEMENT FOR FASTENING OF A STEAM JOINT

FIELD OF THE INVENTION

This application is a continuation-in-part of application Ser. No. 835,939, filed Feb. 14, 1992, now abandoned.

The arrangement of the present invention provides an improvement for the fitting for a steam joint of a paper machine or other drying cylinder against the machine frame, and thus it is possible to install the steam joint with substantially greater care and accuracy in comparison to what is possible with a conventional rod support or a bracket support.

BACKGROUND OF THE INVENTION

The arrangements presently in use comprise introducing steam to the drying cylinder through a steam joint 2 fastened to the end of the cylinder shaft, as illustrated in FIG. 1. The steam joint 2 is supported via supporting arms 26 or bearer bars against the machine frame. Steam is introduced into the cylinder through the rotating shaft 3 of the steam cylinder. Condensate and discharge steam are conducted out of the cylinder via a horizontal condensate discharge pipe 4 into the condensate section 27 of the steam joint 2.

There exist also arrangements with a connection structure for the condensate only, so called condensate joint. However, it is common to have the steam and condensate joints in the same steam joint. The most commonly known structure of the steam joint is shown in FIG. 2. The steam joint 2 is supported against the machine frame (not shown in FIG. 2) with a pair of bars 1. The structure of the steam joint includes frame flanges 28 which are used for fastening the bearer bars 1 to the steam joint 2.

FIG. 3 shows a bracket support construction 5. The bracket 5 is rigidly fixed to the steam joint 2 with fixing screws 24. The bracket 5 is fixed to the machine frame 15 with fixing screws 29.

The drawback of the arrangements in FIGS. 2 and 3 is that the geometric center line 6 and the center axis of the rotating parts inside the steam joint do not coincide with the center line 7 of the cylinder shaft, see FIG. 4b. The differences of the center lines may be due to tolerances of the machining of the steam joint support deviating from the allowed ones. As a result the parts inside the steam joint wear out or suffer damage in a short time.

The Jackson U.S. Pat. No. 4,606,561 describes an arrangement to install a rotary joint to a machine frame by using a bracket support. This construction comprises a tang 52 and fixing bolts 48. The desired positioning of the steam joint is achieved by parts 54, 56, and 58. After positioning the body 50 of the steam joint is fastened to the bracket 46 with bolts 60.

SYSTEM OF THE INVENTION

The arrangement of the present invention utilizes existing fixing points for the support of the old steam joint to the machine frame. According to the present invention the arrangement for fastening of a steam joint to a paper machine frame or similar in alignment with the shaft of a steam cylinder comprises an annular rigid assembly plate having a center opening allowing free passage therethrough for parts of the steam joint to be connected with the interior of the steam cylinder, the assembly plate further being provided with pair of first holes positioned diametrically on opposite sides of said center opening,
at least two second holes positioned on opposite sides of the line defined by said first holes,
a plurality of third holes distributed along the periphery of the assembly plate,
a pair of first rigid fastening screws inserted with clearance through said pair of first holes and secured into threaded holes in the machine frame, distance means provided on said first screws between the machine frame and the assembly plate, second screws provided through said second holes of the assembly plate into engagement with the machine frame, a plurality of third screws for securing a bell support of the steam joint to the assembly plate with help of said plurality of third holes.

In a preferred embodiment of the present invention the said second holes are threaded and said second screws engage the surface of the machine frame.

BRIEF DESCRIPTION OF THE FIGURES

The inventive arrangement is further described by referring the enclosed drawings, where FIG. 1 shows a partly sectional side view of a prior art arrangement where steam is introduced to a drying cylinder through a steam joint fastened to the end of the cylinder shaft;

FIG. 4a shows a end view of a prior art steam joint fastened to a machine frame;

FIG. 4b shows a side view of a prior art steam joint fastened to a machine frame;

FIG. 6a shows a end view of the arrangement of the present invention;

FIG. 6b shows a partially sectional side view of the preferred embodiment of the present invention; and FIG. 6c shows a partially sectional side view of the arrangement of the present invention.

DETAILED DESCRIPTION OF THE INVENTION

Figure 3:
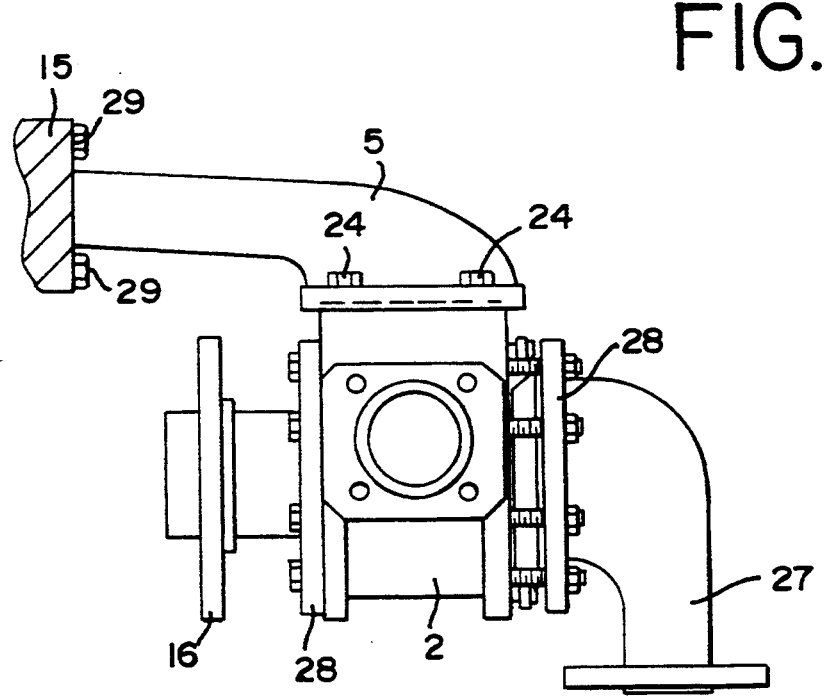
FIG. 3 shows a side view of a prior art bracket support construction.
Figure 2:
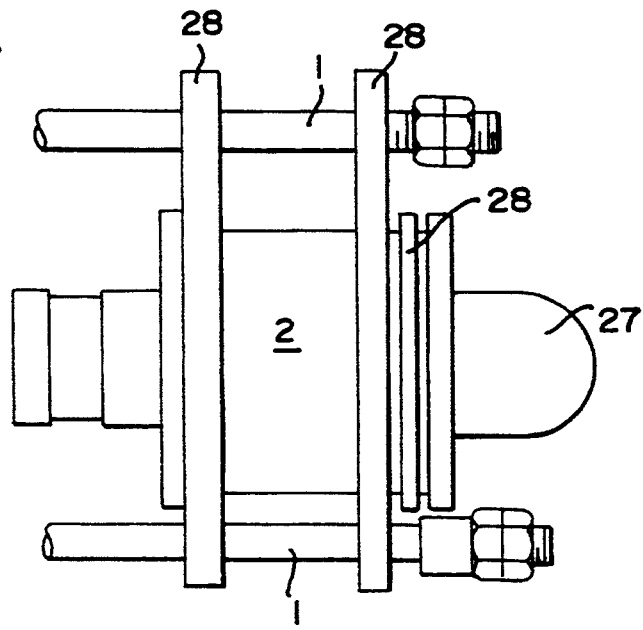
FIG. 2 shows a side view of a prior art steam joint.
Figure 5B:
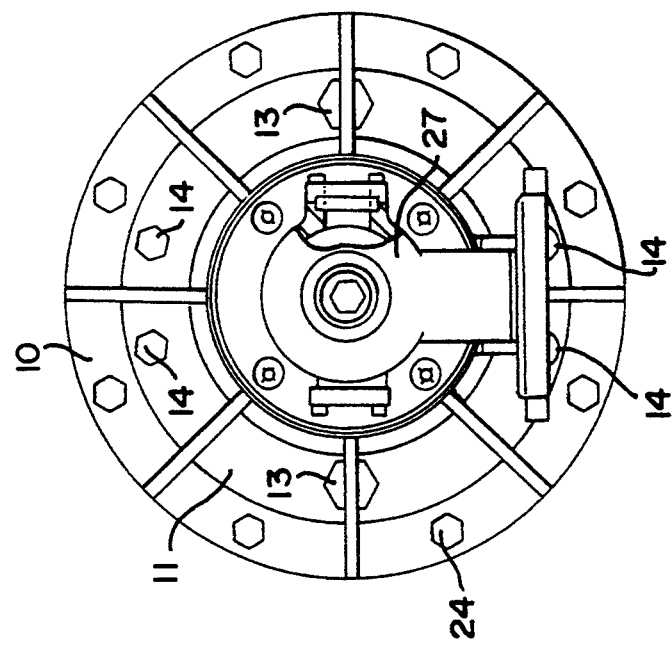
FIG. 5b shows a partially sectional end view of the arrangement of the present invention.
Figure 5A:
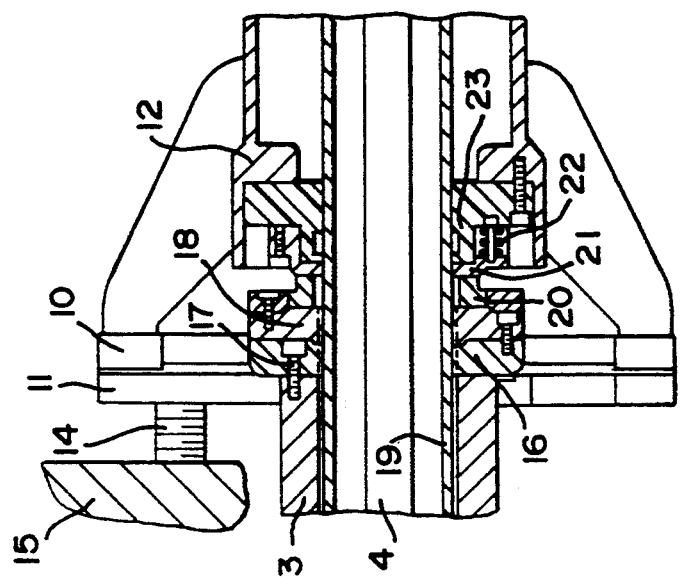
FIG. 5a shows a partially sectional side view of the arrangement of the present invention.

The arrangement of the present invention utilizes existing fixing points for the support of the old steam joint 12 to the machine frame. The arrangement according to the present invention (parts 11, 13 and 14) is shown in FIGS. 5a and 5b.

The plate may be a full ring or a partial ring. The bell support 10 of the body 12 of the steam joint is fixed with a bolted joint to the assembly plate 11 fastened to the machine frame 15.

The body 12 of the steam joint comprises the following parts of the rotating fitting: carbon ring 20 (rotating part), counter-flange 21 for the carbon ring (non-rotating part), spring loading 22 of the counter-flange, and static lip seal 23. The shaft 3 of the rotating steam cylinder comprises the following parts: steam conductor pipe 19, condensate discharge pipe 4, fitting flange 16 of the cylinder shaft, and fixing screws 17 for the fitting flange. Fastening of the steam joint against the machine frame 15 is carried out according to the invention with parts 11, 13 and 14.

In the arrangement of the present invention the bell-shaped support 10 in the body 12 of the steam joint is fastened with screws 24 to the assembly plate 11. The assembly plate 11 comprises the following, for the present invention important parts: assembly plate 11 (remains as a fixed part in the machine frame), fixing screws 13 for fixing to the machine frame 15, and adjusting screws 14 used for adjusting the assembly plate. In the arrangement of the present invention the assembly plate 11 is accurately adjusted with the adjustment screws 14 perpendicularly against the rotating cylinder shaft 3. With fixing screws 13 the center line 7 of the rotating cylinder shaft 3 and the center line 6 of the steam joint 2 may be aligned to coincide before the final fastening of the assembly plate. The fixing arrangement shown in FIGS. 5a and 5b allows the center and the center line of the rotating fitting of the steam joint to coincide exactly with the cylinder shaft. In adjustment there is preferably used a jig tool fitted in the end of the cylinder shaft. The jig facilitates to find the right vertical and horizontal positions for the assembly plate.

To adjust the suitable distance of the assembly plate 11 from the machine frame 15, distance means are provided on said fixing screws 13 between the machine frame and the assembly plate. The distance means may comprise of different kinds of spacer plates or lock nuts. When the adjustment is completed, the assembly plate 11 is locked with the fixing screws 13 as a fixed part of the machine frame.

The arrangement according to the invention makes it possible, by using different adjustment screw 14 variations, to install the assembly plate 11 reliably on varying forms of frame structures of the cylinder bearing house. In one embodiment (FIG. 6c) the holes in the assembly plate are adapted to receive the adjustment screws 14 with a clearance of about 3 to 4 mm, and the screws engage threaded holes in the machine frame 15, which holes may be already existing screw holes in the cover of the bearing house. In this embodiment distance means are provided on the screws between the machine frame and the assembly plate. In an other embodiment said holes are threaded and said screws 14 engage the surface of the machine frame 15 (FIG. 6b).

To the assembly plate 11 fastened steam joint 2 is a separate apparatus wherein the screws and counter parts needed for adjustment of the distance and loading of the rotating fitting are included (see U.S. Pat. No. 4,606,561, parts 54, 56, 58 and 60).

FIGS. 6a, 6b and 6c illustrate the present invention. In FIG. 6a, the assembly plate 11 is fixed with fixing screws 13 against the machine frame. The adjusting screws 14 are provided for adjusting the vertical and horizontal position of the assembly plate 11. The holes 24 are provided for fixing the steam joint. The steam joint can also be fixed to the assembly plate 11 by bracket fixing.

What is claimed is:

1. An arrangement for insuring proper alignment of a steam joint to a paper machine frame relative to the shaft of a steam cylinder comprising;

the machine frame defining a first set of threaded holes;

an annular rigid assembly plate having a center opening allowing free passage therethrough for parts of the steam joint to be connected with the interior of the steam cylinder, a bell-shaped support for the steam joint;

the assembly plate further being provided with a pair of first holes positioned diametrically on opposite sides of said center opening, at least two second holes positioned on opposite sides of the line defined by said first holes, a plurality of third holes distributed along the periphery of the assembly plate;

a pair of first rigid fastening screws inserted with clearance through said pair of first holes and secured into the threaded holes in the machine frame;

distance means provided on said first screws between the machine frame and the assembly plate;

second screws provided through said second holes of the assembly plate into engagement with the machine frame; and a plurality of third screws for securing the bell support of the steam joint to the assembly plate with help of said plurality of third holes.

2. An assembly according to claim 1, wherein said second holes are adapted to receive the second screws with a clearance, the machine frame defining a second set of threaded holes, the second screws engaging said second set of threaded holes in the machine frame, and second distance means being provided on the second screws between the machine frame and the assembly plate.

3. An assembly according to claim 1, wherein said second holes are threaded and said second screws engage the surface of the machine frame.

4. An assembly according to claim 1, comprising two pairs of said second holes and second screws, positioned symmetrically on opposite sides of the line defined by said pair of first holes.

* * * * *